United States Patent Office 3,482,646
Patented Dec. 9, 1969

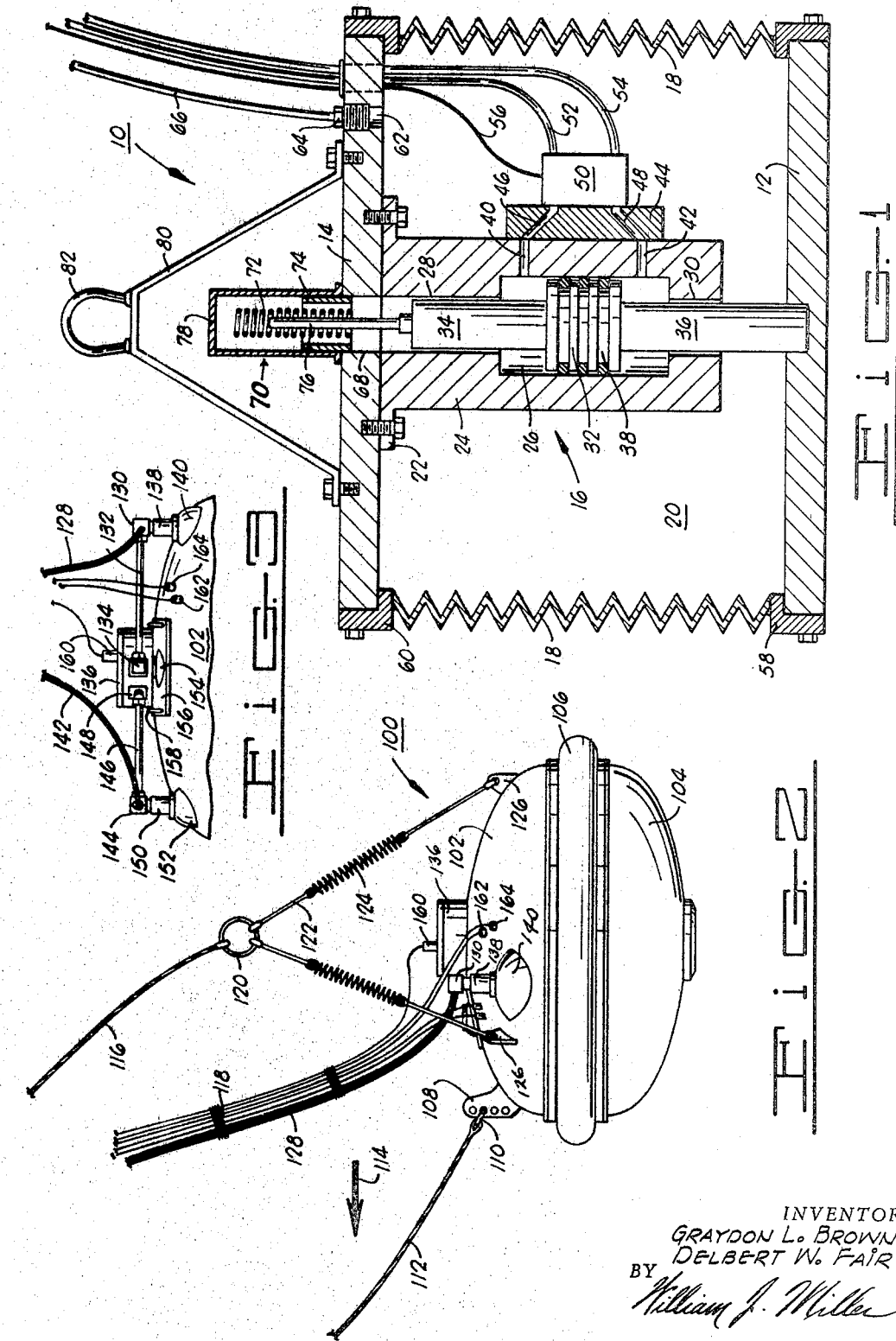

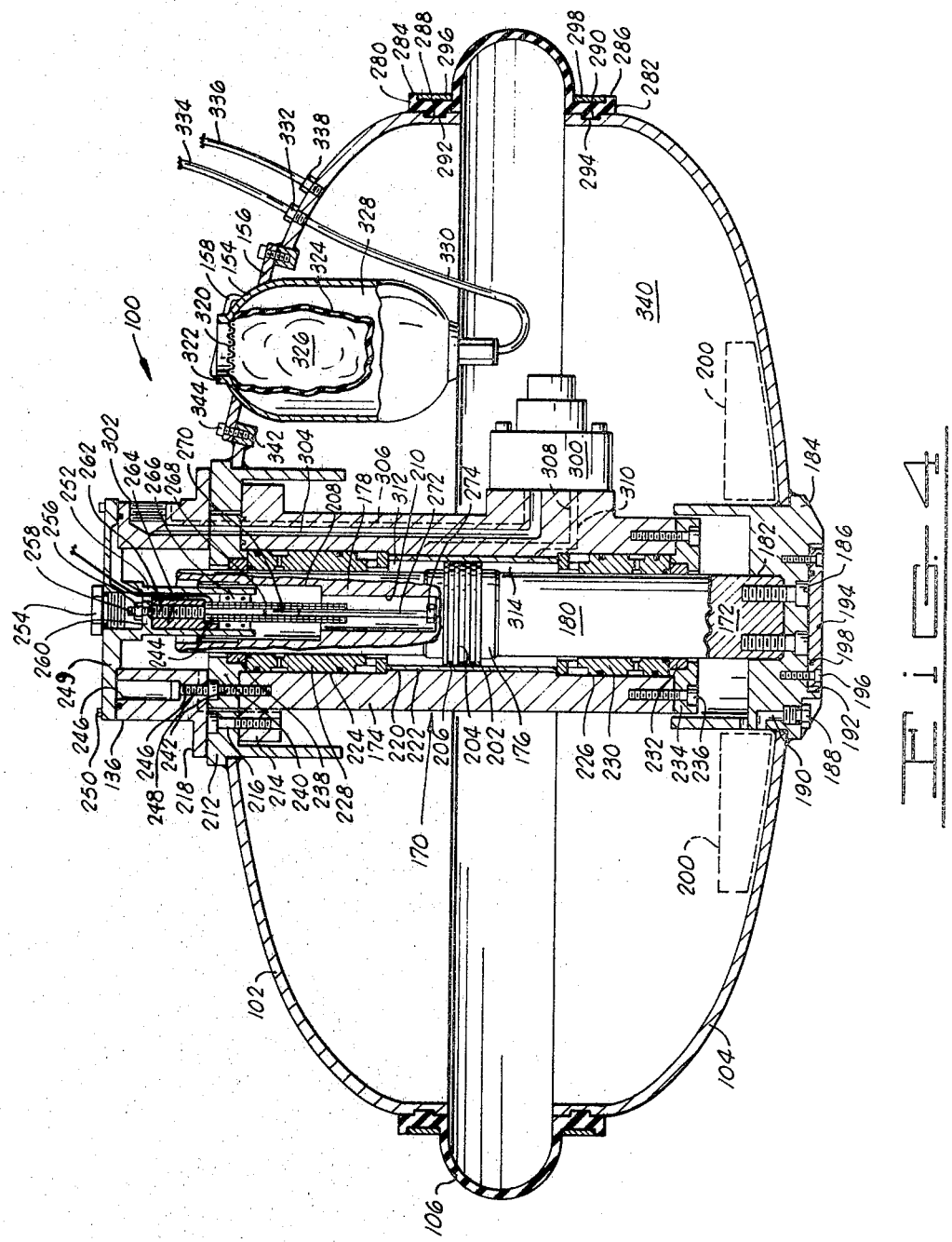

3,482,646
MARINE VIBRATOR DEVICES
Graydon L. Brown and Delbert W. Fair, Ponca City, Okla., assignors to Continental Oil Company, Ponca City, Okla., a corporation of Delaware
Continuation-in-part of application Ser. No. 607,551, Jan. 5, 1967. This application Dec. 13, 1967, Ser. No. 690,330
Int. Cl. G10k 11/00; G01v 1/00
U.S. Cl. 181—.5  3 Claims

ABSTRACT OF THE DISCLOSURE

An improved apparatus for the generation of seismic energy waves within a water medium, the apparatus consisting of a remotely actuatable drive means which is secured between upper and lower housing shells to impart reciprocal motion therebetween in predetermined manner. A flexible sealing means is disposed around the outer periphery and sealingly connected between the first and second housing shells, and means are provided for sampling and adjusting the internal air pressure within the housing shells.

CROSS-REFERENCE TO RELATED APPLICATIONS

This application constitutes a continuation-in-part of the invention as disclosed in co-pending U.S. Patent application Ser. No. 607,551, now Patent No. 3,384,868, entitled "Marine Vibrator Device," filed on Jan. 5, 1967 in the name of Graydon L. Brown and Delbert W. Fair, and assigned to the present assignee.

BACKGROUND OF THE INVENTION

Field of the invention

The invention relates generally to marine seismic sources and, more particularly, but not by way of limitation, it relates to an improved marine vibration apparatus for use in continuously generating seismic energy within a water medium.

Description of the prior art

There are several known types of mechanical vibrator which is suitable for use in a water medium. The prior types have been subject to several difficulties stemming from particular design characteristics as necessitated by the requirements of water-borne instruments. Such marine vibrators must usually rely upon some form of flexible sealing membrane attached between upper and lower moving elements, and such resilient components have proven to be trouble points as they are subject to fatigue breakage necessitating expensive periods of equipment downtime for repair, replacement, etc. In addition, prior types have been found to generate non-linearities of wave output due to certain construction techniques, and such structure may also cause excessive drag and instability as the vibrator unit is towed through the water medium.

SUMMARY OF THE INVENTION

The present invention contemplates a marine seismic energy source of the type wherein a drive source imparts reciprocal motion between a pair of striking members, said drive source being disposed between the members in a sealed enclosure. In a more limited aspect, the invention consists of a pair of streamlined, shell-like housing members disposed generally in parallel and being flexibly sealed as between their respective outer peripheries to define an interior air space, and containing a drive means within the air space connected to the respective housing members to impart reciprocal movement to one housing member with respect to the other.

Therefore, it is an object of the present invention to provide a marine vibrator which is streamlined to provide a minimum water resistance while under tow.

It is also an object of the invention to provide a marine vibrational apparatus which encloses a maximum of components and fasteners out of contact with surrounding sea water to materially reduce problems which arise due to corrosion and electrolysis effects.

It is a further object of the invention to provide improved overall design of marine vibrators which enable necessary adjustments with minimum access hardship, reliably uniform vibrational output, minimum drag and instability during traverse through the water, and more facile handling and stowing on-board survey vessels.

Finally, it is an object of the present invention to provide a streamlined marine seismic source of highly reliable character which produces good acoustic energy output.

Other objects and advantages of the invention will be evident from the following detailed description when read in conjunction with the accompanying drawings which illustrate the invention.

BRIEF DESCRIPTION OF THE DRAWINGS

FIG. 1 is a schematic representation of the basic form of vibrator apparatus;
FIG. 2 is a side view of a preferred design of the present invention in an operating attitude;
FIG. 3 is a partial front view of the apparatus of FIG. 2; and
FIG. 4 is a vertical section of the vibrator device of FIG. 2.

DESCRIPTION OF THE PREFERRED

Referring now to FIG. 1, the vibrator 10 is a relatively basic form of the particular type of seismic vibrator. Vibrator 10 consists of a lower water piston or plate 12 and an upper water piston or plate 14 each connected to be reciprocally driven by means of a hydraulic linear actuator 16. A flexible sealing member such as bellows 18 is connected about the outer periphery of the lower plate 12 and upper plate 14 to provide the continual exclusion of surrounding sea water from the internal chamber 20.

The vibrator 10 has been fully described in the aforementioned parent patent application Ser. No. 607,551. Also, a similar type of vibrator assembly as driven by a hydraulic linear actuator is the particular subject matter of U.S. patent application Ser. No. 592,155, now Patent No. 3,394,775, entitled "Marine Vibration Transducer" which was filed on Nov. 4, 1966 in the name of Cole et al., and which is assigned to the present assignee.

More particularly, the hydraulic linear actuator 16 is securely mounted or fastened to the underside of upper plate member 14 by means of a suitable mounting flange 22 which may be formed integrally with a hydraulic cylinder 24. The hydraulic cylinder 24 defines a central hydraulic chamber 26 having axial end bores 28 and 30 such that a hydraulic piston 32 having respective upper and lower rod ends 34 and 36 may be disposed therein for reciprocal movement. The hydraulic piston 32 may be formed with a plurality of circumferential grooves 38, each groove then retaining a suitable form of commercially available piston ring (not specifically shown). The upper rod end 34 is allowed to reciprocate within the hydraulic cylinder end bore 28 while the lower rod end 36 extends through the cylinder bore 30 into rigidly fastened connection with the lower plate 12.

The hydraulic cylinder 24 is formed with a pair of fluid ports 40 and 42 which communicate with respective upper and lower spaces of hydraulic chamber 26. A manifold casting 44 can then be secured to the outer surface of hydraulic cylinder 24 to place respective port passages 46 and 48 in communication with cylinder ports 40 and 42. The manifold ports 46 and 48 then communicate with fluid passages (not shown) within servo valve 50 for the purpose of controlling fluid application from a hydraulic source (not shown) which is connected by hydraulic lines 52 and 54. A cable 56 is included to show generally the routing for electrical control conductors leading from a remote station or surface position. The particular type of servo valve, a conventional four-way hydraulic control valve, as well as the hydraulic fluid routing and electrical control of such, is more particular subject matter of the aforementioned U.S. patent applications.

The bellows 18 is fastened securely in sealing (water-air) relationship between the outer circumferal edges of the lower and upper plate members 12 and 14 respectively to define the internal chamber 20. It is contemplated that the bellows 18 may be any form of flexible member which is capable of providing the sealing connection and resiliency characteristics. One form of the invention suggests the use of a sturdy, stainless steel variety of bellows member as affixed in sealing relationship by lower and upper mounting rings 58 and 60. The preferred form of the invention may employ a pre-shaped flexible sealing member formed from a suitably rugged and resilient material as will be further described below.

An air passage 62 is placed through the upper plate member 14 and a suitable screw connector 64 and flexible air hose 66 provide connection to air control apparatus located at the surface craft or such remote position. Thus, control of air pressure via hose 66 enables adjustment of the static air pressure within the vibrator 10, i.e. within the internal chamber 20.

The upper plate member 14 is formed with a central bore 68 which is placed to allow the positioning of a selected linearly variable differential transformer, LVDT 70. The LVDT 70 consists of a specially wound coil 72 which is suitably mounted as by a collar member 74 to be centrally suspended over the bore 68. A rod and core 76 secured to the upper end of rod end 34 will then reciprocate a length of permeable material within coil 72 during hydraulic actuation to yield a flux variation which can be sensed or picked up electrically for conduction as a control signal to the surface control position. The cover can 78 provides a water proof covering over the coil 72 and rod-core 76 assembly. Such LVDT assemblies are commercially available from the Sanborn Company of Walton, Mass. and the use of such LVDT assemblies in hydraulic vibrator applications is more particularly covered in each of the aforementioned patent applications.

A suitable hanger strap 80 may be welded or otherwise fastened to the upper surface of upper plate member 14. A shackle or eye-connector 82 can then be affixed thereon to provide a suspension point for connection to a tow cable (not shown).

FIG. 2 depicts a streamlined, preferred form of the basic vibrator shown in FIG. 1 as it would appear in a typical operating attitude. A vibrator 100 is formed with an upper water piston or housing shell 102 as well as a lower water piston or housing shell 104, and these are maintained in a generally parallel disposition and flexibly interconnected in water-tight sealed relationship by means of the bellows or flexible sealing member 106. The housing shells 102 and 104 are each formed as a generally shallow, cup-shaped shell so that least possible water resistance will arise during tow. The top of upper housing shell 102 carries a connecting post 108 which may be connected by a suitable shackle 110 to a tow line 112 which serves to tow vibrator 100 through the water in the general direction of arrow 114.

A lifting cable 116 as well as a bundle of control lines 118 may be allowed to trail in relaxed attitude when tow line 112 is taut and vibrator 100 is underway. The lift cable 116 may be connected via connector ring 120 and a plurality of linkages 122 and shock absorbing springs 124 to eye posts 126 which are welded in equally-spaced relationship about the outer surface of housing shell 102.

The various hydraulic and air hoses and electrical cables of control line bundle 118 are led down through suitable leadthrough packings into their proper connection at the vibrator 100. For example, and referring also to FIG. 3, a hydraulic high pressure hose 128 is led down via control line bundle 118 for connection into a connector block 130. The connector block 130 provides a first connection via a pressure line 132 to a connector block 134 which leads into an upper housing 136. Connector block 130 also provides connection via conduit 138 to a high pressure accumulator 140. Similarly, a low pressure hose 142 is connected through a connector block 134, pressure hose connection 146, and connector block 148 into upper housing 136 while the low pressure source is paralleled from connector block 144 through conduit 150 into a low pressure accumulator 152. The low and high pressure accumulators 152 and 140 may be selected from commercially available types, for example standard Greer accumulators, and they are easily welded in recessed disposition within the upper housing shell 102 by standard techniques.

An additional accumulator housing 154 (to be further described) is welded in a removable porthole cover 156. Porthole cover 156 is equipped with suitable handles 158 which aid in removal and handling. Various other electrical cable lead-ins may be provided through such as connectors 160, 162 and 164 for entry into the interior of vibrator 100.

FIG. 4 shows a hydraulic linear actuator 170 and the various structure and connections within vibrator 100. Thus, the lower water piston or housing shell 104 is rigidly secured to a shaft or rod end 172 (to be further described), while the upper water piston or housing shell 102 is rigidly secured to a cylinder 174 of the linear actuator 170.

The linear actuator 170 includes a piston 176 having an upper or first piston rod-end 178 and which extends downward as a second rod-end 180, this also being an integral formation previously recognized as shaft 172. The shaft 172 is securely fastened into an axial bore 182 of a lower end cap 184 by means of a plurality of fasteners 186, eight high stress, equi-spaced cap screws. The lower end cap 184 is welded within the center of housing shell 104 and a suitable cap screw 188 and drainage hole 190 may be provided. An outward axial bore 192 of lower end cap 184 is disposed to receive a bolt cover plate 194 therein. Thus, cover plate 194 is securely fastened by a plurality of cap screws 196 and a suitable sealing ring 198 prevents the entry of sea water into contact with the high stress cap screws 186 which secure piston shaft 172 to the lower housing shell 104. Ballast weight may be added as desired in balanced relationship at the spaces indicated generally by dash lines 200.

The piston 176 is formed with a plurality of ring lands 202 which define ring grooves 204 therebetween. Each of the grooves 204 may then carry a piston ring 206 therein for the purpose of cylinder sealing in accordance with conventional teachings. Commercially available lock seal (double seal) rings of the ductile iron type have been found to be suitable. The upper rod-end 178 of piston 176 is formed with an upper axial bore 208 which extends downward into a smaller diameter axial bore 210, these providing space for a linearly variable differential transformer (LVDT) as will be further described below.

An upper end cap 212 is securely welded within the upper housing shell 102 in a central disposition to provide proper mounting configurations. Thus, end cap 212 is securely fastened to an upper flange 214 of cylinder 174 by means of a plurality of high stress fasteners 216, e.g. sixteen equi-spaced cap screws. A cover flange 218 of upper housing 136 closes off the screw heads of cap screws 216 to remove them from contact with surrounding sea water.

The hydraulic cylinder 174 is formed with a first ventral bore 220 having a cylinder sleeve liner 222 inserted therein in sliding contact with the plural land elements 202 and piston rings 206 of piston 176. Upper and lower portions of cylinder 174 are slightly larger counterbores 224 and 226 which receive respective packing insets 228 and 230 therein. The packing inserts 228 and 230 may be conventional forms of sealing structure such as bronze rod bushing sleeves. Conventional lubrication and resilient ring sealing techniques are also employed in well-known manner. The lower packing insert 30 is retained in sealing position within counterbore 226 by means of an end cap or sealing ring 232 and retaining ring 234 as secured in position by a plurality of cap screws 236. Similarly, the upper packing insert 228 is maintained in proper disposition within counterbore 224 by means of a sealing ring 238 and retaining ring 240 as secured by a plurality of cap screws 242.

The upper housing 136 provides access and protective cover for an LVDT 244 and, in addition, it provides the function of protecting high stress securing bolts from contact with corrosive environment. Upper housing 136 is formed with a plurality of equi-spaced bores 246 which receive each of cap screws 248 therein to secure upper frame 136 to cylinder retaining ring 240. This provides secure engagement of upper housing 136 to retaining ring 240 and cylinder 174 while removing cap screws 242 and 216 from contact with the surrounding sea water. A top cover plate 249 is then secured in sealed relationship over upper housing 136 by means of cap screws 250 to remove high stress cap screws 248 contact with the corrosive sea water.

The top cover 249 is formed with an axial sleeve 252 extending. The center portion of cover plate 249 is sealed off by a plug 254 which allows screw adjustments access to an adjusting screw 256. Adjustment of screw 256 through lock nut 258 and threaded shoulder 260 provides easy adjustment of the LVDT assembly. Thus, the adjusting screw 256 extends down as an adjustment bolt 262 which, in turn, moves a block 264 carrying a coil clamp 266. The actual LVDT sensor is comprised of a coil 268 and a rod of permeable material 270 which is reciprocally movable therein. The permeable material 270 is supported by a rod 272 and bolt 274 which is fastened in the inner end of bore 210. The particular type of LVDT assembly is commercially available as the model No. 585DT–1000 from the Sanbon Co. of Walton, Mass., and the electrical innerconnection is typical as disclosed in the aforementioned U.S. patent applications. Electrical interconnection can be made by means of the electrical cable 276 leading outward through suitable leadthrough packings from the LVDT coil 268.

The flexible seal 106 is a special type which provides particularly desirable operation and which is described and fully claimed in a copending patent application. The seal 106 may be molded from selected flexible materials such as certain classes of the urethanes, polyvinyl chlorides, etc. The seal 106 is molded as an annular member having upper and lower flanges 280 and 282 respectively. Each of the flange portions 280 and 282 is formed to have a respective lip portion 284 and 286 and a respective bead formation 288 and 290. The upper and lower housing shells 102 and 104 are each formed with respective peripheral grooves 292 and 294 formed therearound such that seal 106 be positioned with bead formations 288 and 290 engaged in peripheral grooves 292 and 294, respectively, and a pair of upper and lower securing bands 296 and 298 are positioned to retain the flexible seal 106 in place. The particular formation of flexible beading has proven to be particularly desirable in providing a lasting flexible seal, this aspect of the invention being presented in greater detail in a copending application.

Hydraulic control of the linear actuator 170 is effected by a servo valve 300, e.g. a Moog servo valve No. 79–102, a three stage, high-flow type of servo control. Hydraulic pressure is applied through fluid hoses 142 and 128 to upper frame 136 as shown in FIG. 3. For example, one side of the hydraulic pressure line would be applied through threaded input connector 302 for passage through the duct 304 which is bored within the wall of cylinder 174 and which leads to the servo valve 300. A similar duct way for the other side of the hydraulic pressure line as shown by dash line 306 would be provided by exercising conventional boring techniques. Similar drilled duct ways within cylinder wall 174 would provide pressure connections such as dash-lines 308 and 310 from servo valve 300 to the upper and lower hydraulic chambers 312 and 314 respectively.

The pressure accumulator 154 provides a means for sensing water pressure immediately external the vibrator 100 for purposes of control and adjutment. The pressure accumulator flask 154 merely has a suitable filter screen 320 across a top neck 322. A flexible bag or diaphragm 324 is secured within the accumulator 154 such that free entry of surrounding water into a space 326 will distend diaphragm 324 in accordance with ambient water pressure and this, in turn, causes proportionate pressure change in the air space 328. The pressure in air space 328 is then reflected back up through an air hose 330, a lead-through connector 332 and a hose 334 to a surface position where the pressure change is noted. A hose 336 connected to a lead through connector 338 provides a means whereby the internal air pressure within internal chamber 340 of vibrator 100 may be varied. The air hoses 334 and 336 may be suitably bundled or supported within the control line bundle 118 as shown in FIG. 2.

The portable cover 156 is secured over a porthole 342 in sealed relationship by means of a plurality of cap screws or such fasteners 344. Thus, the porthole cover 156 can be easily unfastened and removed by means of handles 158 to allow access to the internal chamber 340 of vibrator 100 for repair, adjustment, or whatever purposes. Also, internal access may be provided between upper and lower housing shells 102 and 104 when the flexible seal 106 is removed, or at least loosened on one side.

OPERATION

The vibrator 100 would normally be operated from a suitable support craft carrying the necessary auxiliary equipment, i.e., hydraulic system, air regulator, electronics, etc. The vibrator 100 may be hoisted or lowered by means of the lift cable 116 (FIG 2), and towing in the proper attitude is enabled by a tow cable 112 secured at a selected point along the forward tow connector 108. When the vibrator 100 is immersed into a water body to a preselected depth, onboard air control equipment may be operated to adjust the static air pressure within internal chamber 340 (FIG. 4) with respect to the ambient water pressure. Thus, pressure immediately surrounding vibrator 100 would distend flexible diaphragm 324 by a predetermined amount to cause a proportionate increase in air pressure within chamber 328 and delivery hoses 330 and 334 such that suitable metering of pressure change at the surface position will yield a relative pressure indication. The onboard air equipment can then be operated to apply or withdraw air pressure through airline 336 to adjust the internal air pressure within chamber 340 to a predetermined amount.

When the static air pressure within chamber 340 has been set, the vibrator 100 is in condition for operational use and it can then be operated through a desired duration of vibration, that is, any of a number of frequencies occurring in upsweeps, downsweeps, and so forth as is conventional vibrational surveying practice. It is well known that it is usually desirable to generate an output seismic signal which is an upsweep or a downsweep of frequencies between about five and eighty or ninety cycles per second. Many factors including the conditions of water bottom and sub-terrain will enter into the selection of vibration frequencies and the duration of vibrator output.

Actuation of vibrator 100 is effected through the hydraulic lines 128 and 142 and servo valve 300 to alternately apply and withdraw hydraulic fluid pressure from the ports 308 and 310 which lead to the respective upper and lower expansion chambers 312 and 314 in linear actuator 170. In usual practice, the pressure application to chambers 312 and 314 works complementarily since the one is expanded while the other is proportionately contracted. Such alternating pressure application is controlled by servo valve 300 in well known manner.

Thus, a hydraulic energy is applied to move the hydraulic piston 176 upward and the lower housing shell 104 is moved upward dilational particulate motion is imparted to the water medium below the striking face or outer surface of housing shell 104. Then as the direction of hydraulic piston 176 is reversed, its downward movement forces the lower housing shell 104 downward, and compressional particulate action takes place to generate the alternate acoustic action. Thus, the vibrator 100 generates acoustic energy which travels outward and downward through the water body in well-known manner to be later detected as refracted or reflected seismic energy.

The foregoing discloses a novel marine vibrator of a type which enables increased output efficiency and reduced probability of mechanical failure while embodying many attributes as to streamlined configuration, operational convenience and access, and additional structural safeguards.

It should be understood that the specification of materials set forth herein is merely by way of example and that many metals, alloys, etc. may be employed in constructing the marine vibrational transducer; it should also be understood that the physical dimensions and overall design of the vibrator may be varied within wide limits.

What is claimed is:

1. A streamlined marine seismic energy vibrator comprising a first cup-shaped housing means symetrically shaped about an axis, second cup-shaped housing means symmetrically shaped about an axis and disposed with its open end adjacent the open end of said first housing means and having its axis aligned with the axis of said first housing means, flexible seal means having first and second ends connected between the periphery of the open ends of the respective first and second housing means to define an enclosed housing, linear actuator means having a housing, a piston within said housing with mounting means on one end of said housing and a piston rod connected to said piston extending from the other end of said housing, means for attaching said mounting means to the interior surface of said first cup-shaped housing means so that the housing axis and the actuator housing axis are coincidental and means for attaching said piston rod to the inside of said second housing whereby operation of said actuator means will cause said cup-shaped housing means to be actuated in opposite directions and said flexible seal will follow the reciprocal movement of said cup-shaped housings preventing an influx of water into the interior of said vibrator.

2. A vibrator as set forth in claim 1 which is further characterized to include:
    container means secured within said first housing means and having an opening through said first housing means;
    flexible diaphragm means sealingly connected across said first housing means opening; and
    means connected to said container means to indicate changes in the container interior pressure in response to movement of said diaphragm means.

3. A vibrator as set forth in claim 2 wherein said flexible diaphragm means compirses:
    a flexible bag sealingly connected about said opening and extending downward into said container means interior.

References Cited
UNITED STATES PATENTS

| | | | |
|---|---|---|---|
| 3,056,104 | 9/1962 | De Kanski et al. | 181—.5 |
| 3,246,289 | 4/1966 | Mellen | 340—8 X |
| 3,280,938 | 10/1966 | Tullos | 181—.5 |
| 3,392,369 | 7/1968 | Dickie et al. | 340—8 X |
| 3,394,775 | 7/1968 | Cole et al. | 340—12 X |

RODNEY D. BENNETT, JR., Primary Examiner

CHARLES E. WANDS, Assistant Examiner